Oct. 18, 1955   C. D. WALDRON ET AL   2,720,945
FLUID DRAG BRAKE
Filed July 11, 1951
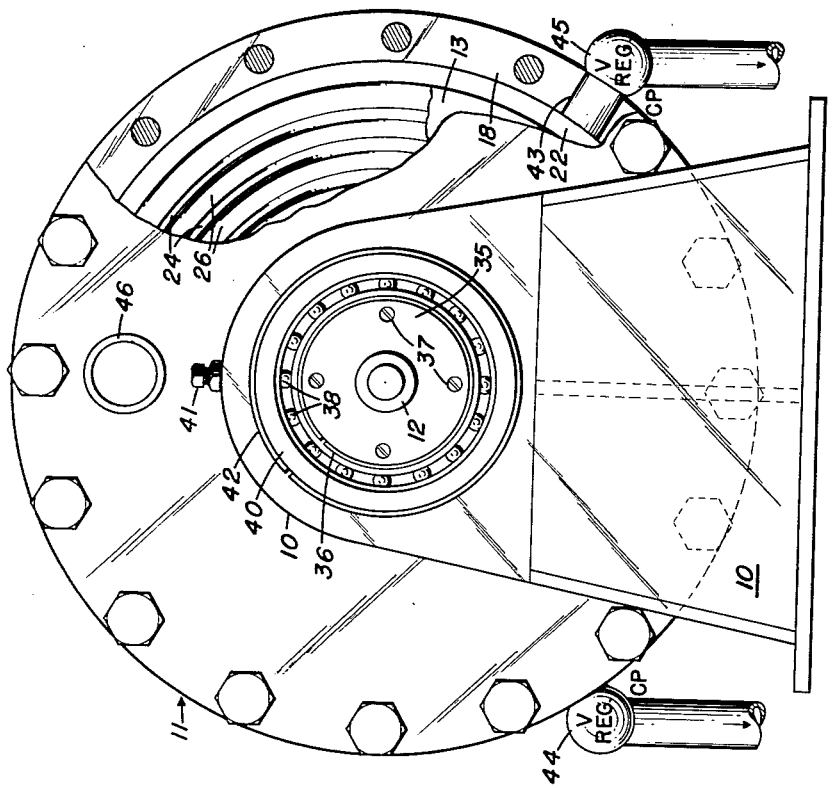
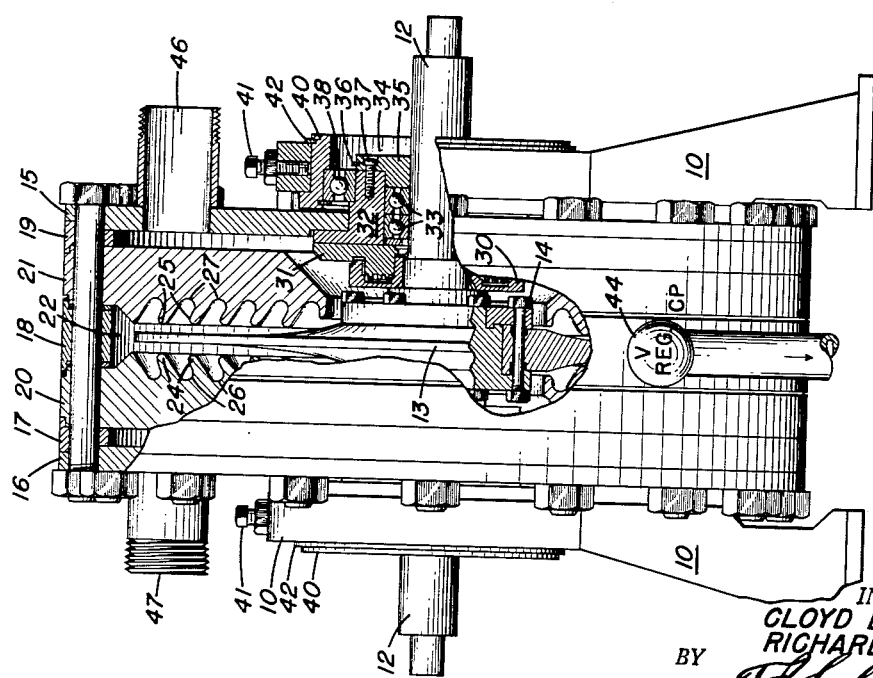
INVENTORS
CLOYD D. WALDRON
RICHARD A. GRAFF
BY
*F. J. Schmitt*
*Walter S. Pawl*
ATTORNEYS

United States Patent Office 2,720,945
Patented Oct. 18, 1955

2,720,945

FLUID DRAG BRAKE

Cloyd D. Waldron, Glenwood, Ark., and Richard A. Graff, Parma Heights, Ohio

Application July 11, 1951, Serial No. 236,254

9 Claims. (Cl. 188—90)

(Granted under Title 35, U. S. Code (1952), sec. 266)

This invention relates to fluid drag rotating disc absorption dynamometers. Apparatus constructed in accordance with the present improvements is characterized by being operable at very high speeds at which large values of horsepower may be absorbed and by the absence of cavitation or erosion during or from such operation.

More specifically the invention is directed to power absorption and transmitting hydraulic dynamometers which have annularly smooth, i. e. free of radial flutes, stators and rotors. The fresh liquid is preferably introduced at or near the center of the rotor where zero hydraulic head exists and the heated liquid is positively scavenged by a pressure control means on the perimeter of the casing. As stated, the dynamometer has a smooth rotor devoid of radial flutes or other radially disposed configurations calculated to produce drag, and a stator having concentric rings or grooves which are shaped to cause any liquid which tends to flow radially inward along the surface of the casing to be deflected toward the rotor disc. The rotor disc then gives the deflected liquid a centrifugal force which causes it to flow radially outward. Accordingly, for partial loads the apparatus will maintain a homogeneous band of liquid near the rim of the disc and no liquid touches the rotor near its shaft except the small amount of incoming fresh liquid. This incoming liquid is not held against the disc to cause appreciable drag. Steady accurate load control is obtained for part loads as only a definite predetermined portion of the disc near its rim is wetted at part loads.

The use of a pressure responsive discharge means at the perimeter of the casing permits independent load control and liquid temperature regulation. This is so because the radial depth of liquid is determined by the pressure responsive means irrespective of the feed rate. The feed rate will effect the temperature but not the load on the dynamometer and the discharge control automatically responds to maintain the predetermined radial depth of liquid. The initial setting may be by valve adjustment or changing valves.

Prior to the present improvements hydraulic dynamometers with radially disposed flutes were known. They are suitable only for low speed or low horsepower. They have poor load control and considerable cavitation difficulties. Electric dynamometers are subject to magnetic leakage difficulties, are limited in horsepower and are expensive. They often require elaborate accessory equipment. Similarly, arrangements of reduction gears and a hydraulic dynamometer cradled together are bulky, complicated and expensive.

The combination of a stator having fluid deflecting grooves and a rotor as herein set forth gives good part load control over a wide range of speeds. A single speed design may be provided by providing clearance between the stator and rotor disc large enough to permit flow of hydraulic fluid radially outward, and yet small enough for the boundary layer or the rotor disc to prevent radial inward flow on the stator. In this limited device the grooves on the stator could be omitted. The use of grooves however adds great flexibility to the device with respect to both operation and design. The grooves, in their preferred form, have a shape which gives the liquid a velocity component toward the rim of the rotor disc after being deflected. This helps to maintain the liquid in the region near the rim of the disc and is particularly important for part load operation.

It is an object of the present invention to provide a hydraulic type dynamometer which may operate at very high speeds without cavitations or erosion.

Another object is to provide a hydraulic disc type dynamometer with means to prevent recirculation of liquid from the perimeter of the disc to the shaft and thus avoid the wetting of the entire disc surface which makes control difficult especially at partial loads.

Another object is to provide a dynamometer in which the liquid temperature control and load control are independent of each other.

Another object is to provide in combination, a smooth rotor and a stator with a deflecting ring or rings facing the rotor.

Another object is to provide a dynamometer with improved part load characteristics in which fresh liquid is introduced near the center of the rotor and in which heated liquid is scavenged along the perimeter under predetermined pressure conditions.

Another object is to provide a dynamometer with which a low pressure and low horsepower pump may be used to push coolant fluid into the dynamometer and in which the liquid is positively scavenged.

These and other objects will be manifest from a consideration of the following description, claims, and drawing in which:

Fig. 1 is a front elevational view partly in section showing the assembly of the pedestal, casing, and the novel combination of rotor disc and stator.

Fig. 2 is a side elevational view with a fragmentary portion of the casing plate removed so as to show the smooth annular grooves of the stator rings.

Fig. 1 shows a pedestal 10 for supporting the casing 11 of the dynamometer unit. A rotor shaft 12 on which is secured rotor disc 13 as by bolts 14 may turn freely with respect to the casing when driven by a power source such as an engine or turbine, not shown, in a well known manner. Also, and as will be understood, means, not shown, is conventionally joined to the casing 11 for measuring or equalizing the torque applied to the casing through the hydraulic fluid during operation.

According to the invention the casing 11 may be formed from end or cover plates 15, 16, spacing rings such as 17, 18, 19, and the ring stators 20, 21. The locking ring 18 together with the stators 20, 21 form a cavity 22 near the rim of the rotor 13.

The stators 20, 21 are of novel design and on their side facing the rotor have integral therewith or affixed thereto a number of ring portions 24, 25. The rings 24, 25 form grooves 26, 27 on the stator face and may be arranged in a series of vertically aligned rings as shown. The number of rings may vary as may their shape.

The rings 24, 25 are concentric with the rotor shaft 12 and the rotor 13. The stator does not have any radially extending obstacles such as radial flutes or waffle like designs of prior devices. The rings 24, 25 being concentric with the rotor do not produce cavitation even at high speeds but instead provide an annularly smooth surface over which the hydraulic fluid may move.

The grooves 26, 27 between the rings are preferably somewhat cup like as shown so as to give a radially outward velocity to fluid moving from the stators 20, 21 to the rotor 13.

The rotor 13 has solid smooth faces and is capable of very high speeds without cavitation. In the illustrated embodiment the smooth faced solid rotor is shown as slightly tapered. This tapering is not considered essential to the broad concept altho it tends to further restrict the hydraulic fluid to the outer perimeter of the dynamometer during operation and has desirable stabilizing and strength characteristics with light weight for large or plural disc constructions.

The rotor shaft 12 is a step shaft for cooperating with thrust bearings. The precise mounting of the rotor shaft in the casing is not deemed critical and will be briefly described.

The rotor shaft 12 turns with seal plate 30 which rotates in close proximity to sealing plate 31. The plates 30 and 31 form a seal as shown for incoming hydraulic fluid. A bearing housing 32 surrounds ball bearing members 33 positioned about the rotor shaft 12. A bearing cover 34, ring 35, split ring 36 and receiving bolt 37 complete the rotor bearing assembly.

Bearings such as 38 are provided on both sides of the unit to permit movement of the casing with respect to pedestal 10. A ring 40 is secured to the pedestal 10 by lock screw 41. Split ring 42 prevents lateral movement of ring 40.

Spacer ring 18 of the casing 11 is provided with two holes 43 for the introduction of a constant pressure hydraulic outlet valve conventionally shown at 44, 45. These valves are used to maintain a constant predetermined radial depth of hydraulic fluid irrespective of the inlet feed rate. They may be adjusted or selectively used.

The casing 11 has inlets 46, 47, one for each stator. The incoming fluid enters behind the stator rings 20, 21 to flow through the opening between the rotor shaft 12 and the stator ring. It then flows radially or spirally outward into the widening clearances between stators and the rotor disc 13 and then into the cavity 22 which surrounds the rotor disc perimeter. From cavity 22 it moves out through the casing discharge valve openings 44, 45 as above explained.

The horsepower load on the rotor shaft, or drag on the disc, is changed by varying the pressure at which the valves at 44, 45 open. This changes the amount of surface of the disc that has liquid pressed against it and dragging on it. Changing the feed changes the temperature of the liquid in cavity 22, but does not change the radial depth of liquid nor the load on the dynamometer.

A low pressure pump for the inlet fluid may be used as the liquid is introduced at the center of the rotor where zero head exists. The liquid may be introduced from both sides of the rotor disc.

Recirculation of the liquid from the perimeter of the disc to the shaft along the stator is prevented by the grooves 26, 27 which interrupt its flow and additionally deflect the liquid toward the rotor. It is an important feature of the present improvements that the configurations on the stator interrupt and deflect downward flow and yet presents a non-fluted surface for circular flow.

The above described embodiment is deemed illustrative only and is subject to modification and alteration without departure from the inventive concept. For example, it is considered within the scope of the present improvements to incorporate above described features in multiple rotor disc versions and to use the rings on the stators with feeds having an inlet removed from the rotor shaft. Also that concentric grooves i. e. without radial flutes or the like may be used in the rotor disc and/or that the fluid may be introduced through the rotor shaft into the space between plural rotors and stators at a point near the shaft.

Similarly while an automotive pressure responsive valve has the advantages recited above it is not essential to the broadest concept of invention and a torque controlled or an ordinary manual valve may sometimes be used to regulate the pressure in the dynamometer. Also it is plain that the stator may be integral with rather than fixed to the casing. If this be done, pipe 46 would of course be connected directly to the stator and proper passages in the stator could be formed as by drilling so as to introduce liquid near the rotor as the stator may rest directly on the trunnion bearing mount.

These and other variations will suggest themselves after consideration of the disclosure. It is desired to be limited only by the scope of the claims appended hereto.

The invention described herein may be manufactured and used by or for the Government of the United States of America for governmental purposes without the payment of any royalties thereon or therefor.

What is claimed is:

1. In a fluid drag rotating disc absorption dynamometer the combination of a casing, a rotor shaft mounted for turning in said casing, a rotor fixed to said shaft, a stator fixed to said casing, said rotor and stator each having a cooperating side spaced from the other and which is free from radial projections, one of said sides having an annular ring concentric with the rotor shaft and inclined outwardly toward the periphery of said one side to provide control of flow of fluid between the said rotor and stator.

2. In a fluid drag rotating disc absorption dynamometer, the combination of a casing, a rotor shaft mounted for turning in said casing, a rotor fixed to said shaft, a stator fixed to said casing, said rotor and stator each having a cooperating side which is free from radial projections, said stator having an annular ring on its said cooperating side concentric with the rotor shaft and inclined outwardly toward the periphery of said stator to interrupt the radially inward flow of fluid during operation.

3. The combination of claim 2 further defined in that the rotor has an additional smooth side which cooperates with an additional stator having an adjacent side free of radial projections.

4. The combination of claim 2 further defined in that the rotor is tapered toward its rim perimeter.

5. In a fluid drag rotating disc absorption dynamometer, the combination of a casing, a rotor shaft mounted for turning in the said casing, a smooth surfaced rotor fixed to said shaft, a stator fixed to said casing, said stator having fluid deflecting rings on its face opposite the smooth surfaced rotor, said rings being concentric with the rotor shaft and extending toward the rotor and inclined outwardly toward the periphery of said stator so as to form inclined cuplike grooves in the stator.

6. In a fluid drag rotating disc absorption dynamometer, the combination of a casing, a rotor shaft mounted for turning in said casing, a rotor fixed to the rotor shaft, a stator spaced from the rotor and rigid with said casing, said rotor and stator each having a cooperating side which is free from radial projections, said stator having an annular ring on its cooperating side concentric with the rotor shaft and inclined outwardly toward the periphery of said stator, a fluid inlet passage leading from outside the casing to the space between the rotor and stator at a point near the rotor shaft, a release valve positioned on the perimeter of the casing and in communication with the rotating fluid during operation so that excess fluid will be discharged so as to control the temperature of the dynamometer.

7. The combination of claim 6 further defined by the inclusion of an additional stator spaced from the rotor and rigid with said casing and positioned on the rotor side opposite from the first named stator, and an additional fluid inlet in the casing on the rotor side opposite from said first named inlet.

8. The combination of claim 5 further defined in that the rotor is tapered toward its rim perimeter.

9. In a fluid drag rotating disc absorption dynamometer, the combination of a casing, a rotor shaft mounted for turning in said casing, a rotor having smooth sides fixed to the rotor shaft, a stator fixed to said casing and having a side free from radial projections spaced from and cooperating with each side of said rotor, each of said stator sides having fluid deflecting rings, said rings being concentric with the rotor shaft and extending toward the rotor and inclined outwardly toward the periphery of said respective stators, and the spacing between each stator and the rotor increasing from near the rotor shaft to the rim of the rotor.

References Cited in the file of this patent

UNITED STATES PATENTS

| | | |
|---|---|---|
| 1,238,447 | Severy | Aug. 28, 1917 |
| 1,482,167 | Varley | Jan. 29, 1924 |
| 1,610,830 | Walker | Dec. 14, 1926 |

FOREIGN PATENTS

| | | |
|---|---|---|
| 166,815 | Germany | Jan. 18, 1906 |
| 206,354 | Germany | Feb. 2, 1909 |
| 313,483 | Germany | July 14, 1919 |